United States Patent [19]
Beane

[11] Patent Number: 6,032,351
[45] Date of Patent: Mar. 7, 2000

[54] MACHINE FOR REMOVING STRINGERS FROM PALLETS

[75] Inventor: Timothy R. Beane, Grafton, Ohio

[73] Assignee: Pallet Recycling, Inc., Barberton, Ohio

[21] Appl. No.: 09/080,790

[22] Filed: May 18, 1998

[51] Int. Cl.⁷ .................................................. B23P 19/04
[52] U.S. Cl. ...................... 29/564.3; 29/239; 29/426.4; 83/431; 83/471.2; 83/474; 83/676; 83/943
[58] Field of Search ............................. 83/943, 676, 488, 83/155, 477, 477.1, 472, 473, 471.2, 431, 474, 666; 29/564.3, 426.4, 239, 252, 403.3

[56] References Cited

U.S. PATENT DOCUMENTS

| | | |
|---|---|---|
| 3,846,890 | 11/1974 | Bielkiewicz ........................... 29/200 D |
| 3,869,780 | 3/1975 | Ginnow et al. ............................ 29/200 |
| 4,152,819 | 5/1979 | Conkle ....................................... 29/252 |
| 4,241,495 | 12/1980 | Wakeem . |
| 4,320,570 | 3/1982 | Williams . |
| 4,346,506 | 8/1982 | Martindale ............................... 29/239 |
| 4,392,403 | 7/1983 | Martindale, Jr. .......................... 83/418 |
| 4,435,892 | 3/1984 | Williams ................................. 29/239 |
| 4,586,235 | 5/1986 | Benvenuto ............................ 29/564.3 |
| 4,649,617 | 3/1987 | Hunfnagel .............................. 29/426.4 |
| 4,750,255 | 6/1988 | Hufnagel . |
| 4,945,626 | 8/1990 | Dykstra et al. . |
| 5,105,526 | 4/1992 | Dykstra et al. . |
| 5,205,197 | 4/1993 | Wiltshire . |
| 5,211,094 | 5/1993 | Johnson . |
| 5,243,751 | 9/1993 | Dykstra et al. . |
| 5,249,352 | 10/1993 | Landers ..................................... 29/432 |
| 5,307,554 | 5/1994 | Johnson et al. . |
| 5,323,525 | 6/1994 | Johnson . |
| 5,375,315 | 12/1994 | Griffith et al. ............................ 29/432 |
| 5,379,513 | 1/1995 | Thompson et al. ....................... 29/772 |
| 5,404,777 | 4/1995 | Skaar et al. ................................ 83/42 |
| 5,414,924 | 5/1995 | Johnson et al. . |
| 5,600,882 | 2/1997 | Beane . |

*Primary Examiner*—M. Rachuba
*Attorney, Agent, or Firm*—Rankin, Hill, Porter & Clark LLP

[57] ABSTRACT

A machine for removing stringers from pallets includes a table assembly that establishes a working surface upon which a pallet can be placed and a carrier assembly that is movable relative to the pallet. The carrier assembly includes a pair of spaced, parallel, elongate cutter rails, the cutter rails being spaced a distance greater than the width of a stringer and adapted to receive a stringer therebetween. A cutting assembly is connected to the cutter rails toward the ends thereof, the cutting assembly including rotatable upper and lower disks connected to the cutter rails. The disks are positioned side-by-side such that the edges thereof are in contact with each other. The upper disks are spaced closer to the ends of the cutter rails than the lower disks. As the cutting assembly is advanced through a pallet, the upper and lower disks shear the nails that hold the stringer in place within the pallet. Severed stringers are collected in a trough and are removed automatically by a conveyor.

20 Claims, 5 Drawing Sheets

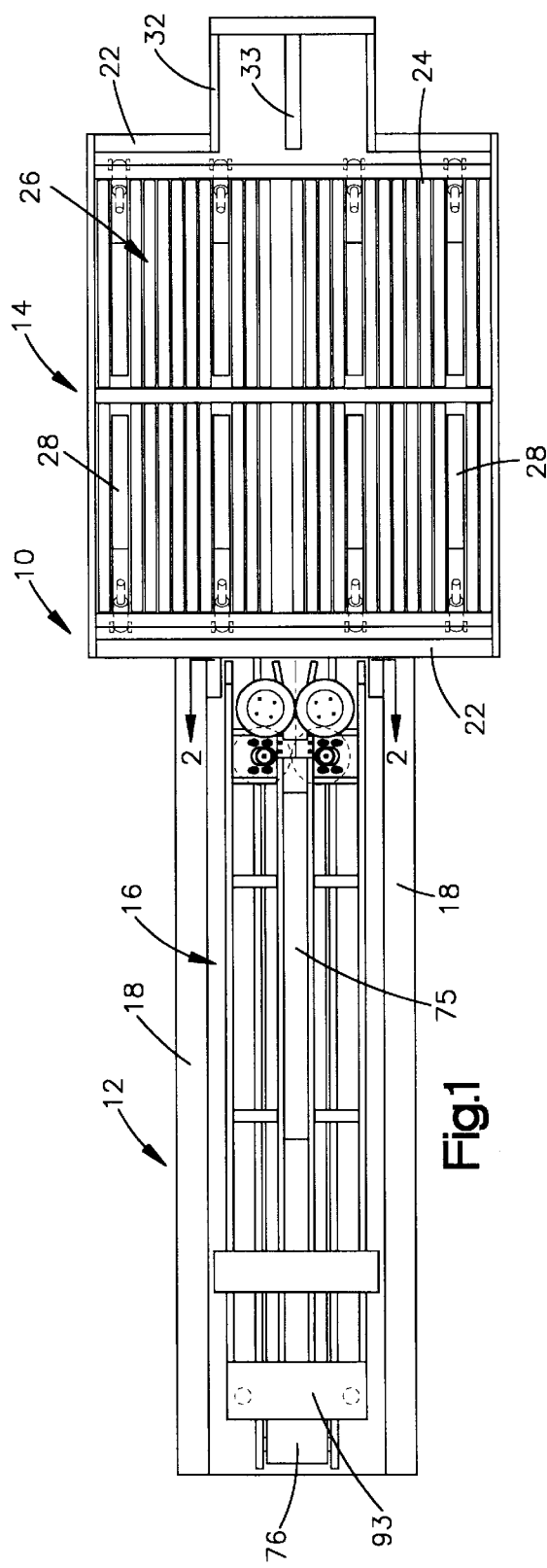
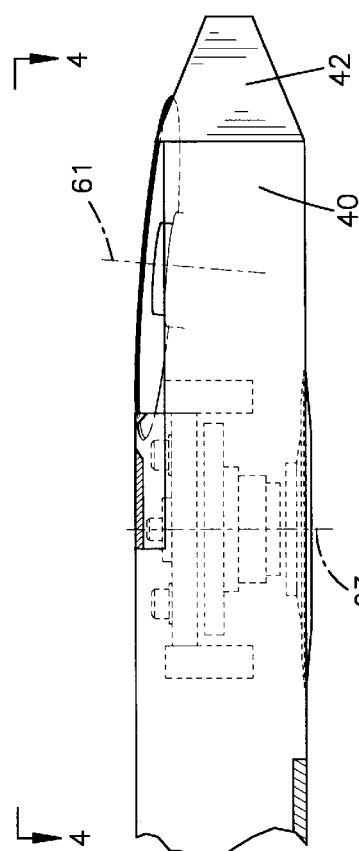
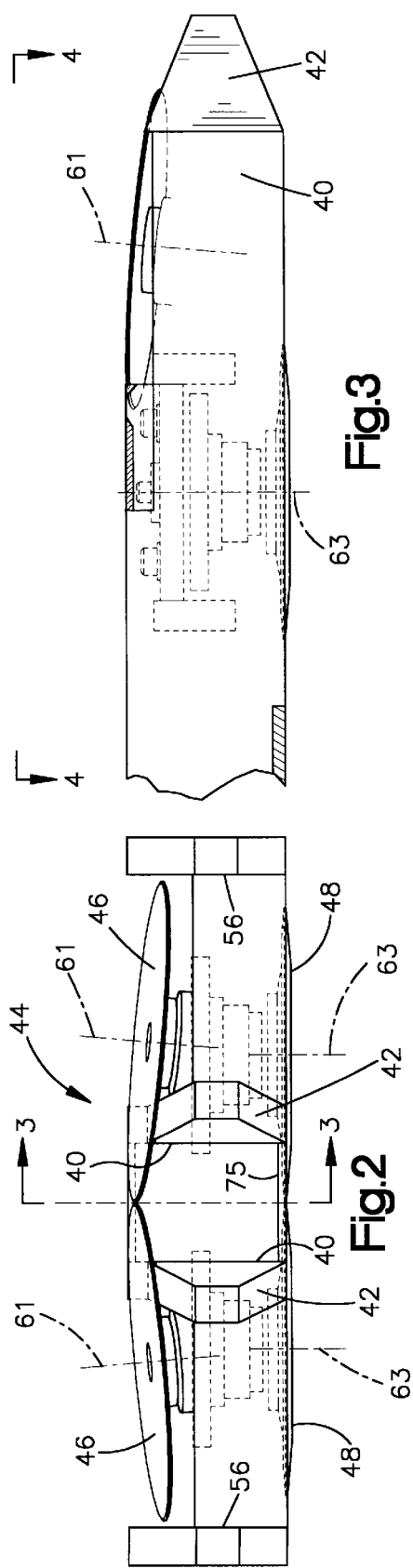

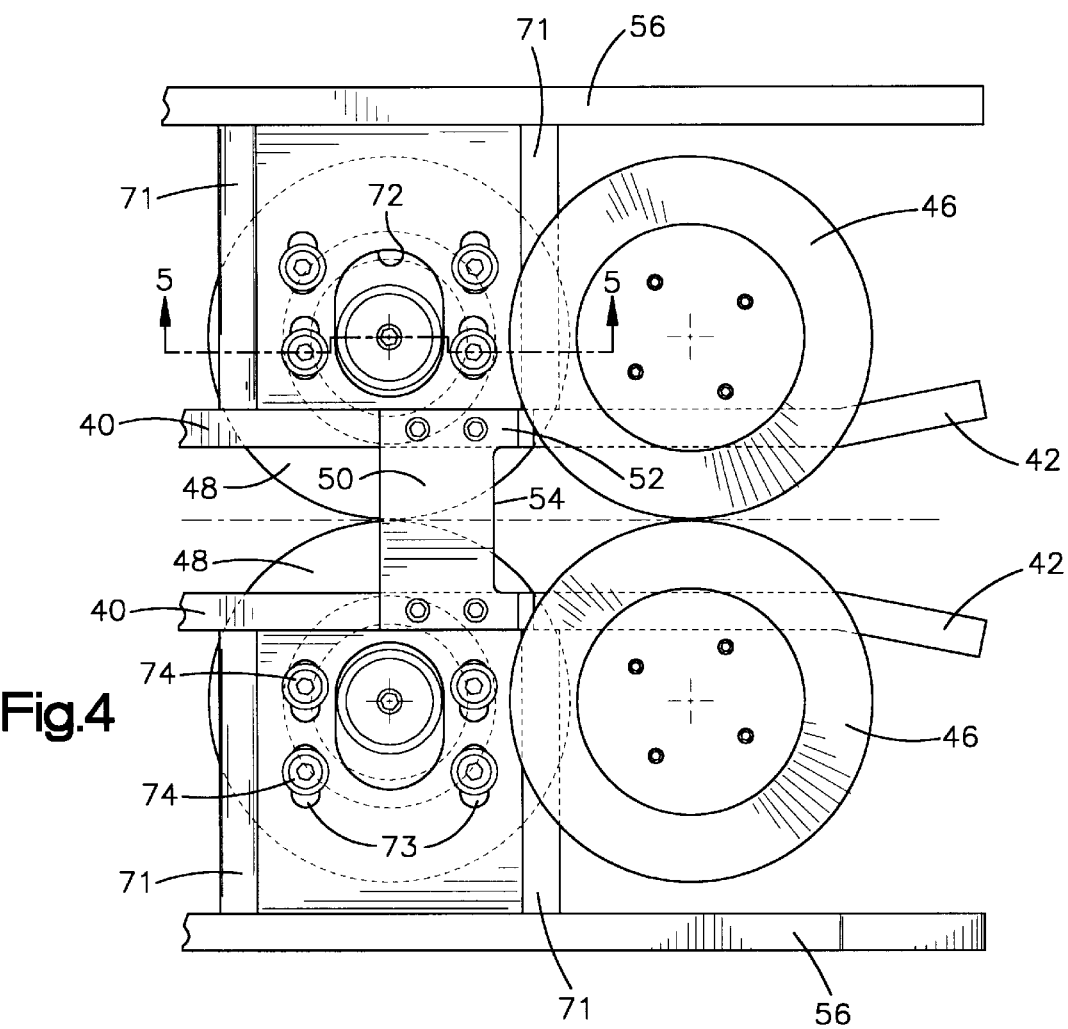
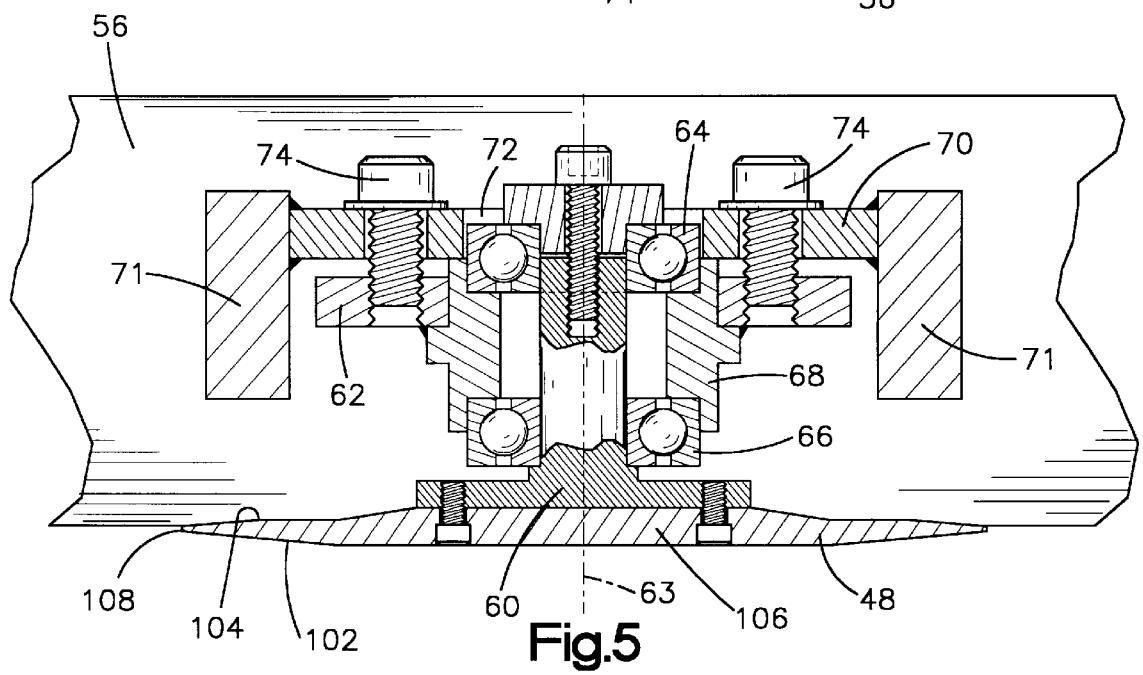

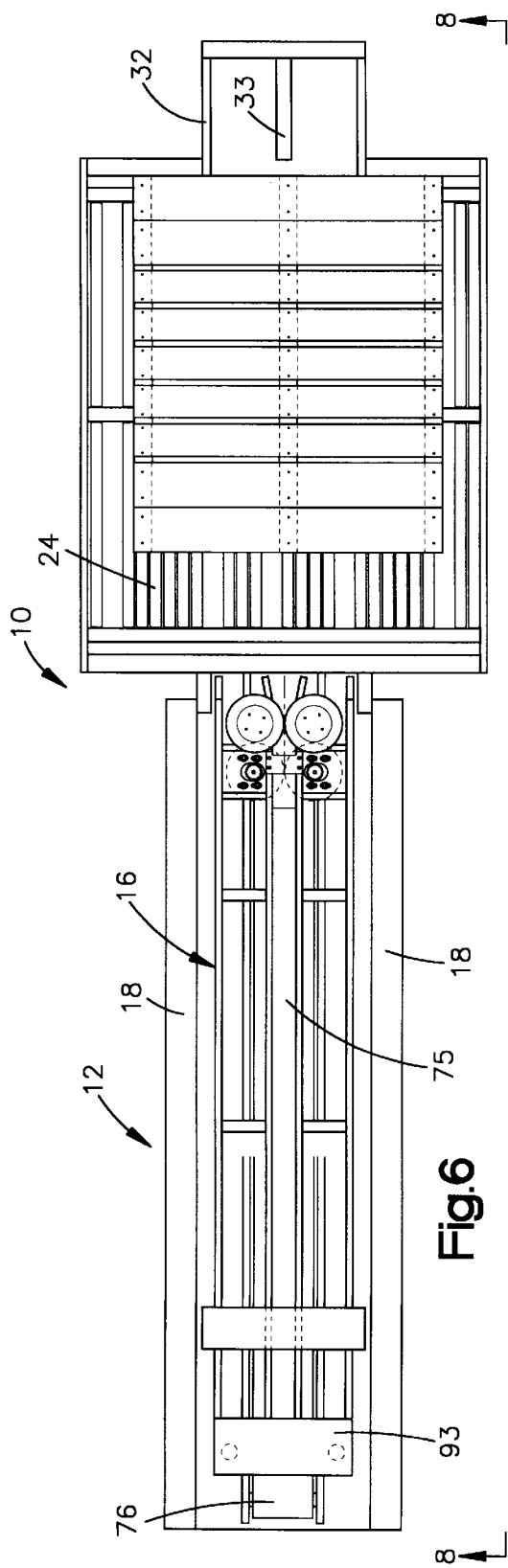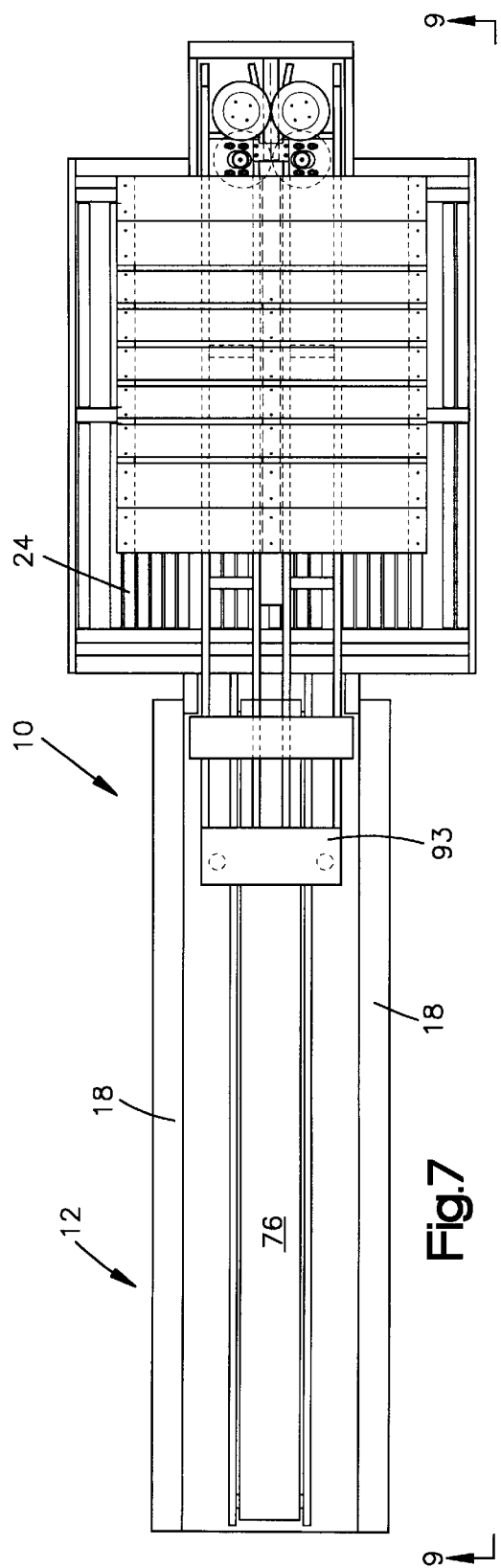

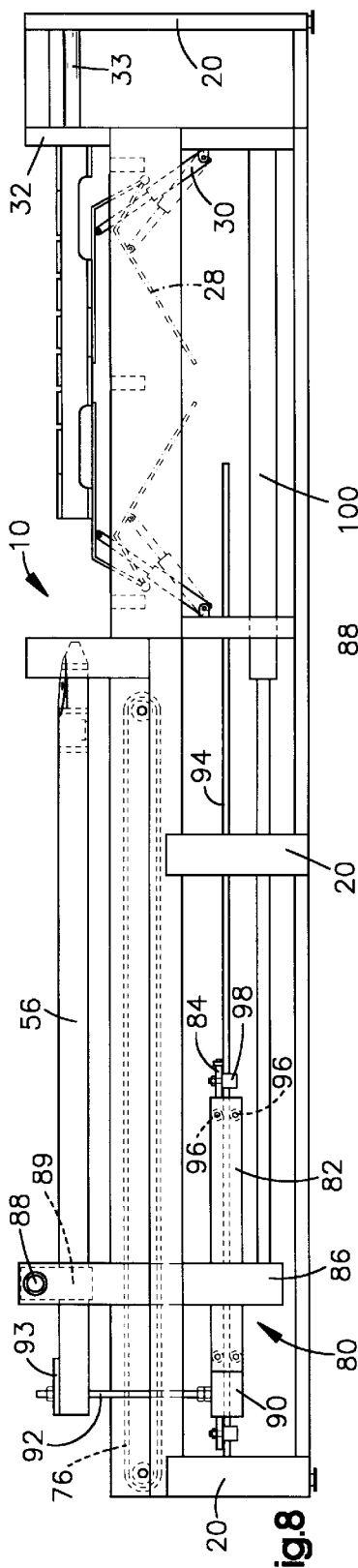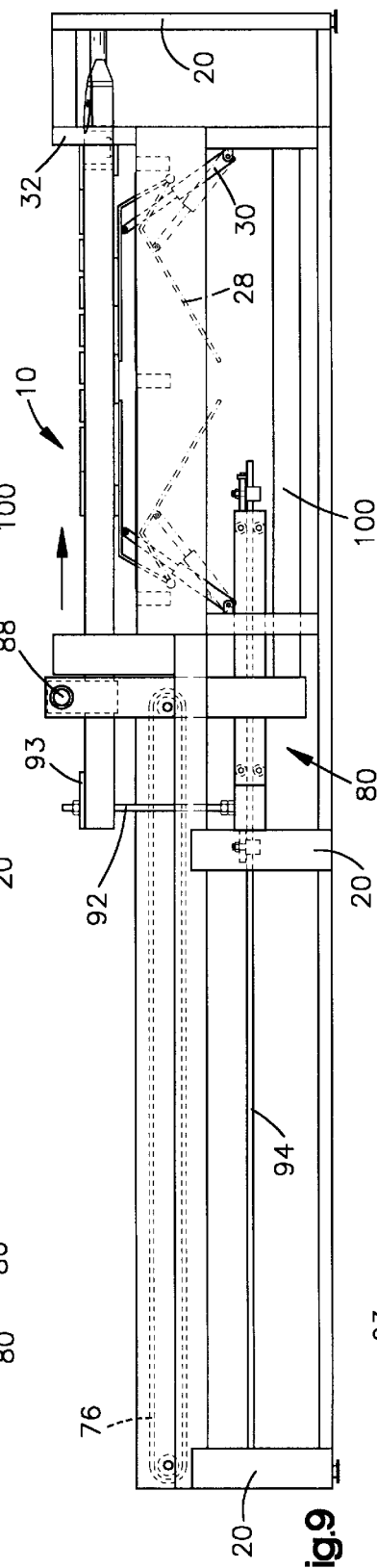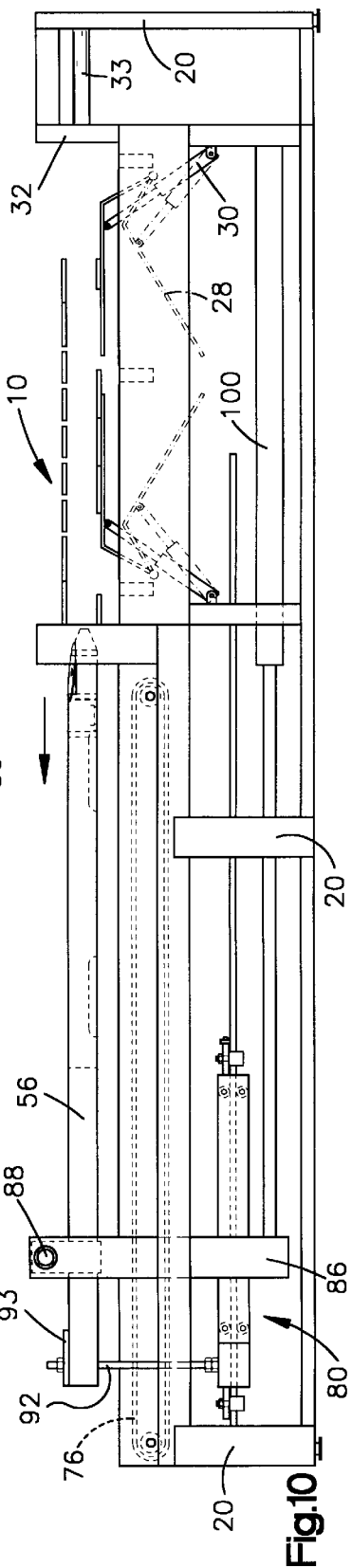

MACHINE FOR REMOVING STRINGERS FROM PALLETS

BACKGROUND OF THE INVENTION

1. Field of the Invention

The invention relates to the repair of pallets and, more particularly, to techniques for removing damaged stringers from pallets.

2. Description of the Prior Art

Load-bearing pallets fabricated of wooden components frequently are used to transport and store various articles, machines, or materials. Such pallets generally are of two types: the stringer type and the block type. Stringer-type pallets include three spaced, parallel support members to which upper and lower deckboards are nailed. Block-type pallets employ a number of relatively small, spaced blocks to which upper and lower deckboards are nailed. The spaces between the stringers or the blocks are adapted to receive the tines of conventional forklift trucks.

In the course of being moved from place to place, the pallets frequently become damaged. If a damaged pallet is not repaired, eventually it must be discarded because of its inability to safely and securely support and transport articles or materials. Because a new pallet is expensive, it is desirable to repair damaged pallets rather than to buy new ones, if possible.

Due to the large number of pallets that must be repaired, it is important that high quality pallet repairs be done quickly and inexpensively. Unfortunately, pallet repairs usually are done by hand. That is, damaged pallets must be partially or totally disassembled with crowbars or similar manual tools and reassembled with new components. In the particular case of repairing damaged stringers, the deckboards must be removed or at least separated from the stringers in order to permit any nails that interconnect the deckboards and stringers to be removed or sheared.

Efforts to automate the pallet repair process have not been effective. Mechanized pallet repair to date usually has consisted of the complete dismantlement of the pallets, with the damaged components being discarded and the good components being used to make new pallets. Examples of machines used to dismantle pallets completely are shown in U.S. Pat. Nos. 4,241,495; 4,320,570; 4,945,626; 5,105,526; 5,211,094; 5,243,751; 5,307,554; 5,323,525; 5,414,924, and 5,600,882.

It has been attempted to repair pallets mechanically by removing and replacing only damaged components of the pallets. See U.S. Pat. Nos. 4,750,255 and 5,205,197 for examples of machines that can be used to remove only stringers from pallets. Although the referenced machines attempt to improve the stringer removal process, such machines suffer from a variety of drawbacks.

Many of the referenced machines employ disks that shear, or attempt to shear, the nails that hold the deckboards to the stringers. Usually, two disks cooperate to shear any nails that are encountered. A significant drawback of these devices is that the disks experience rapid wear, thereby increasing the cost of the stringer-removal process as well as increasing downtime due to the need for frequent part replacement or repairs. Furthermore, the disks, even when sharp, do not function to shear the nails as much as to bend the nails and tear them from the stringers or the deckboards. The significant resistance occasioned by advancing the disks through the pallets often leads to breakage of otherwise good pallet components. It is believed that the undesirable performance of prior machines is due to a number of factors, including improper disk design, improper positioning of the disks relative to each other, and excessive flexure of the disks.

Desirably, a stringer removal machine would be available that would enable pallet repairs to be accomplished with a minimum of manual labor and with an increase in processing speed. Hopefully, any such machine would have cutting elements that shears nails effectively without bending them. Such a machine preferably would be sufficiently reliable that part replacement or repairs would be avoided substantially.

SUMMARY OF THE INVENTION

In response to the foregoing concerns, the present invention provides a new and improved machine for removing stringers from pallets. The machine according to the invention includes a table assembly that establishes a working surface upon which a pallet can be placed. In the preferred embodiment, the table assembly has a backstop that prevents pallets from moving. A carrier assembly is spaced from the working surface and is movable toward and away the backstop. Preferably, the working surface is horizontal.

The carrier assembly includes a pair of spaced, parallel, elongate cutter rails, the cutter rails being spaced a distance greater than the width of a stringer and adapted to receive a stringer therebetween. Each cutter rail has a tapered end for insertion into the space between the deckboards. A cutting assembly is connected to the cutter rails toward the ends thereof, the cutting assembly including rotatable upper and lower disks connected to each cutter rail. The upper disks are spaced side-by-side such that the edges thereof are in contact with each other; likewise, the lower disks are spaced side-by-side such that the edges thereof are in contact with each other. The upper disks lie in a plane generally parallel with the upper surface of the cutter rails and the lower disks lie in a plane generally parallel with the lower surface of the cutter rails. The upper and lower disks are supported such that the distance between them does not change during a stringer removal operation. Preferably, the upper disks are positioned closer to the ends of the cutter rails than the lower disks. A bridge plate spans the cutter rails to separate the deckboards from the stringers as nail-shearing occurs.

The machine includes means for reciprocating the carrier assembly toward and away from a pallet disposed on the table assembly. The pallet is disposed so that the stringers are parallel with the cutter rails and the cutter rails are positioned on either side of a stringer to be removed. As the upper and lower disks are advanced through the pallet, they shear any nails that connect the deckboards and the stringer.

In the preferred embodiment, the table assembly includes rollers for permitting a pallet to be moved easily back and forth relative to the carrier assembly. The table assembly also includes movable arms for lifting a pallet placed on the working surface a distance above the working surface adequate to center the space between the deckboards vertically relative to the cutter rails.

The carrier assembly includes a pair of stabilizer rails, similar in size and shape to the cutter rails, that strengthen the carrier assembly and provide support for the disks. The support is provided by a support plate that extends between and connects adjacent cutter rails and stabilizer rails. Preferably, the disks are about 10 inches in diameter and are made of a material suitable for shearing nails, for example, steel. It has been found that particularly effective nail-shearing action is obtained if the disks are mounted on spindles that are supported by spaced bearings. The bearings are disposed in a bearing carrier that is connected to a mounting plate which in turn is adjustably connected to the support plate.

The spindles that support the upper disks rotate about an axis of rotation that is (a) inclined toward the forward end of the cutter rails at an angle of about 4.0 degrees when viewed from the side and (b) inclined away from the center of the cutter rails at an angle of about 2.5 degrees when viewed from the front. Similarly, the spindles that support the lower disks rotate about an axis of rotation that is inclined toward the rearward end of the cutter rails at an angle of about 0.7 degree when viewed from the side and which is not inclined from the center of the cutter rails when viewed from the front.

An elongate plate is disposed beneath the cutter rails and spans the space therebetween so as to form an open-ended trough into which severed stringers can be inserted. A conveyor is positioned beneath the end of the trough remote from the end of the cutter rails that carry the disks. As stringers are removed from pallets, they are pushed into the trough. The preceding stringers are pushed onto the conveyor for disposal elsewhere.

By use of the present invention, stringer removal can be accomplished exceedingly efficiently, with minimal manual labor. The rollers enable a pallet to be positioned easily on the working surface, and the movable arms lift the pallet for proper insertion of the cutter and stabilizer rails. The disks are non-powered and very reliable. The particular placement of the disks and orientation thereof results in effective nail-shearing action. After all of the nails that hold a given stringer in place have been sheared, the severed stringer is disposed of without any action being required of the machine operator. The old pallet can be moved from the table assembly and a new pallet can be positioned in its place in a matter of seconds.

The foregoing and other features and advantages of the invention will be apparent from reviewing the following description and claims, taken in conjunction with the accompanying drawings.

BRIEF DESCRIPTION OF THE DRAWINGS

FIG. 1 is a top plan view of a machine for removing stringers according to the invention;

FIG. 2 is an end elevational view of a carrier assembly according to the invention;

FIG. 3 is a cross-sectional view of the carrier assembly of FIG. 2 taken along a plane indicated by line 3—3 in FIG. 2;

FIG. 4 is an enlarged plan view of the carrier assembly of FIG. 2 showing upper and lower cutter disks;

FIG. 5 is a cross-sectional view of a lower cutter disk according to the invention taken along a plane indicated by line 5—5 in FIG. 4;

FIG. 6 is a view similar to FIG. 1 with a pallet positioned on a table assembly;

FIG. 7 is a view similar to FIG. 6 with the carrier assembly inserted into the pallet;

FIG. 8 is a side elevational view of the invention of FIG. 6 taken along a plane indicated by line 8—8 in FIG. 6;

FIG. 9 is a side elevational view of the invention of FIG. 6 taken along a plane indicated by line 9—9 in FIG. 7;

FIG. 10 is a view similar to FIG. 9 in which the carrier assembly has been withdrawn from the pallet;

DESCRIPTION OF THE PREFERRED EMBODIMENTS

Figure 11:
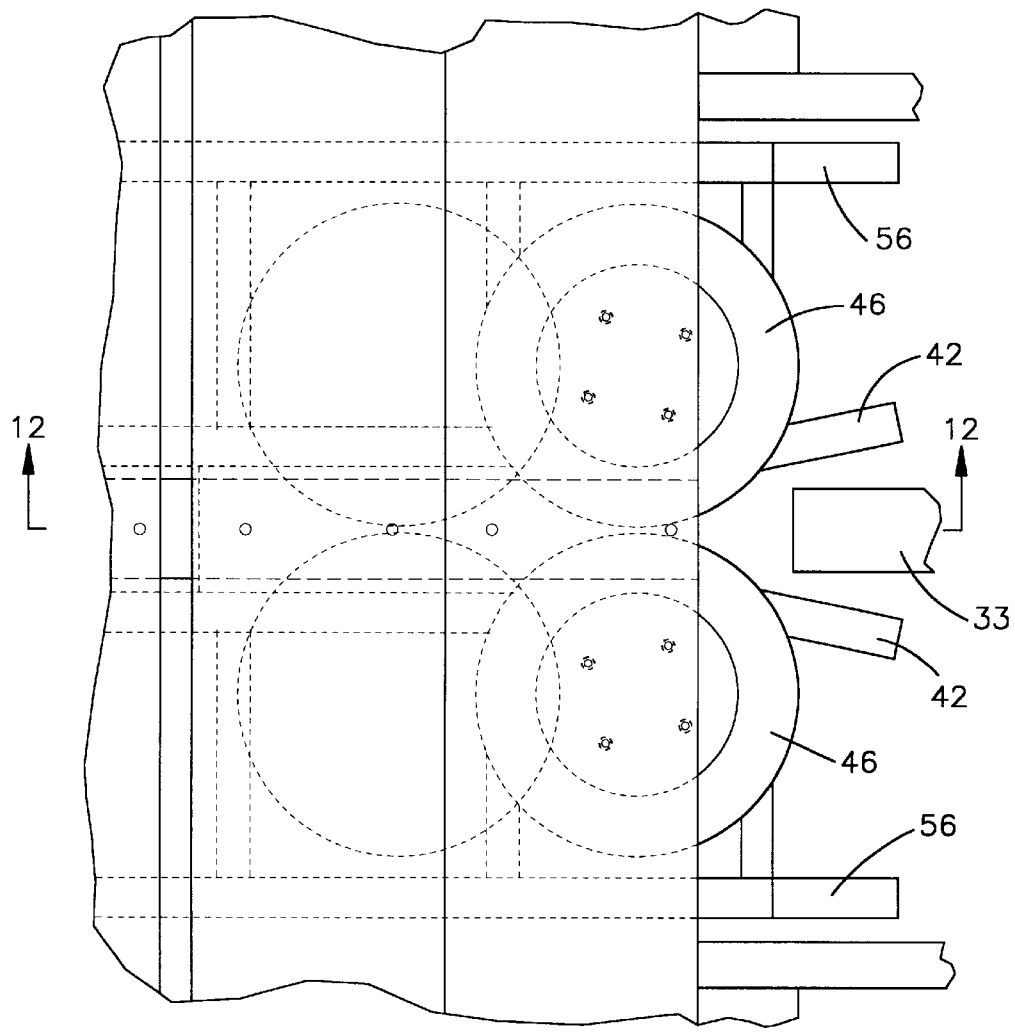
FIG. 11 is an enlarged top plan view of a portion of the carrier assembly according to the invention inserted into a pallet.
Figure 12:
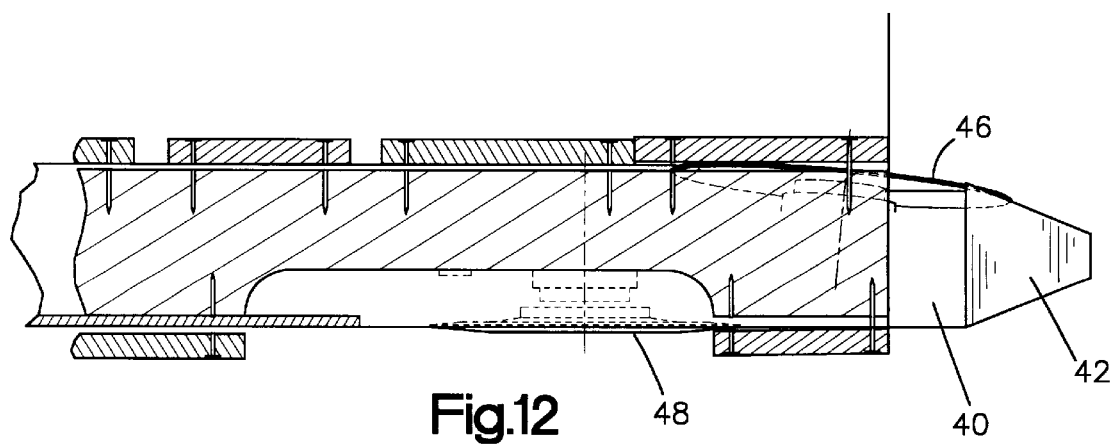
FIG. 12 is a cross-sectional view of the carrier assembly of FIG. 11 taken along a plane indicated by line 12—12 in FIG. 11.

Referring to the various Figures, a machine for removing stringers from pallets is indicated generally by the reference numeral 10. The machine 10 includes a frame 12, a table assembly 14, and a carrier assembly 16.

The frame 12 includes a plurality of longitudinally extending beams 18 connected to vertically extending posts 20. The posts 20 are connected by cross braces 22. The frame 12 supports the carrier assembly 16 for reciprocating movement toward and away from the table assembly 14.

The table assembly 14 includes a plurality of rollers 24 that define a horizontal working surface 26. The rollers 24 rotate about axes that are parallel with the path of travel of the carrier assembly 16. The table assembly 14 includes a plurality of movable arms 28, each powered by a pneumatic cylinder 30. The arms 28 extend through spaces in the rollers 24. The arms 28 are movable from a retracted position (dashed line positions in FIGS. 6–8) to an extended position (solid line positions in FIGS. 6–8). The table assembly 14 includes a backstop 32 against which pallets can be pushed. The backstop 32 has a horizontal bar 33 that in use engages a stringer being removed from a pallet and prevents it from moving. The bar 33 must be small enough and long enough to fit within the forwardmost portion of the carrier assembly 16 (FIGS. 7 and 9).

The carrier assembly 16 includes a pair of spaced, parallel, elongate cutter rails 40. The cutter rails 40 are spaced a distance greater than the width of a stringer and are adapted to receive a stringer therebetween. Each cutter rail 40 has a tapered end 42 for insertion into the space between the deckboards of a pallet. The carrier assembly includes a cutting assembly 44 connected to the cutter rails 40 toward the ends thereof, the cutting assembly 44 including rotatable upper and lower disks 46, 48 connected to each cutter rail 40. The upper disks 46 are spaced side-by-side such that the edges thereof are in contact with each other; likewise, the lower disks 48 are spaced side-by-side such that the edges thereof are in contact with each other. The upper disks 46 lie in a plane generally parallel with the upper surface of the cutter rails 40, and the lower disks 48 lie in a plane generally parallel with the lower surface of the cutter rails 40. The upper disks 46 are positioned closer to the tapered ends 42 than the lower disks 48 by a distance of approximately the width of one deckboard, i.e., approximately six inches. If desired, the lower disks 48 could be positioned more forwardly than the upper disks 46.

A bridge plate 50 is disposed atop and connects the cutter rails 40. Another bridge plate (not shown) is disposed below and connects the cutter rails 40. For convenience, reference to the bridge plate 50 herein will be taken to refer to both bridge plates, it being understood that the lower bridge plate will contact lower deckboards. The bridge plate 50 is located immediately behind the cutter disks 46 in the direction of travel of the disks 46. The bridge plate 50 includes a pair of beveled legs 52 disposed atop each of the rails 40, and a notched portion 54 located between the legs 52. The notched portion 54 is beveled on its underside. The beveled legs 52 form a ramp that causes upper deckboards to be lifted from the stringer being removed. The beveled part of the notched portion 54 caused stringers to be forced downwardly as removal occurs.

The carrier assembly 16 includes a pair of stabilizer rails 56 that are similar in size and shape to the cutter rails 40. The stabilizer rails 56 strengthen the carrier assembly 16 and provide support for the disks 46, 48. The stabilizer rails 56 and the cutter rails 40 are spaced a distance such that an adjacent cutter rail 40 and stabilizer rail 56 can fit within the space defined by two adjacent pallet stringers.

Each of the disks 46, 48 is supported for rotation by a spindle 60. A mounting plate 62 is provided for each of the spindles 60. The mounting plates 62 extend between adjacent cutter rails 40 and stabilizer rails 56. The mounting plates 62 are adjustable relative to the cutter rails 40 and the stabilizer rails 56 in order to adjust the lateral and longitudinal position of the disks 46, 48.

The spindles 60 are supported for rotation by upper and lower bearings 64, 66 which are disposed within a flanged bearing carrier 68. A support plate 70 is rigidly connected to adjacent cutter rails and stabilizer rails 40, 56 by cross braces 71. The cross braces not only support the suport plate 70, but they also serve to rigidly connect the adjacent rails 40, 56 to each other. The support plate 70 has a central opening 72 that is generally aligned with a central opening in the adjacent mounting plate 62. The bearing carrier 68 is disposed in the central opening in the mounting plate 62. The bearing carrier flange is rigidly connected to the mounting plate 62 by means of a weld. The support plate 70 includes a plurality of parallel slots 73 that are perpendicular to the longitudinal axes of the carrier rails and stabilizer rails 40, 56. A plurality of fasteners 74 (in this case set screws) extend through the slots 73 in the support plate 70 to connect the mounting plate 62 to the support plate 70. Set screws (not shown) extend laterally through openings in the stabilizer rails 56 and bear against the mounting plates 62 to apply lateral force thereto. The foregoing construction enables the disks 46, 48 to be adjusted laterally relative to the cutter rails 40.

An elongate plate 75 is disposed beneath the cutter rails 40 and spans the space therebetween. Together, the plate 75 and the cutter rails 40 form an open-ended trough into which removed stringers are inserted. A conveyor 76 is positioned beneath the trough and runs parallel thereto for receiving stringers displaced from the trough. The drive motor for the conveyor is not shown.

The carrier assembly includes a carriage 80 that supports the cutter rails 40 and the stabilizer rails 56 for reciprocating movement. The carriage 80 includes a pair of side plates 82 that are interconnected by a beam 84. A pair of uprights 86 extend above the upper level of the side plates 82. A pivot shaft 88 connects the upper ends of the uprights 86 and extends through pivotally mounted side plates 89. The rails 40, 56 are connected to the plates 89. A plate 90 extends rearwardly from the side plates 82 and supports a pair of threaded rods 92. The rods 92 are connected to the ends of the rails 40, 56 by a connecting plate 93. Upon suitable adjustment of the threaded rods 92, the rails 40, 56 will be pivoted about the pivot shaft 88. In turn, the position of the tapered ends 42 relative to the working surface 26 can be adjusted.

The frame 12 includes a stationary carriage rail 94. The side plates 82 are provided with upper and lower rollers 96 that ride on the carriage rail 94. The carriage 80 is centered relative to the carriage rail 94 by means of rollers 98 that ride on the outside surfaces of the carriage rail 94. A hydraulic cylinder 100 is connected between the frame 12 and the carriage 80. The hydraulic cylinder 100 is disposed parallel to the path of travel of the carrier assembly 16.

Referring particularly to FIGS. 2 and 3, the spindles 60 that support the upper disks 46 rotate about an axis of rotation 61. The axis of rotation 61 is inclined toward the tapered end 42 at an angle of about 4.0 degrees when viewed from the side (FIG. 3) and is inclined away from the center of the cutter rails 40 at an angle of about 2.5 degrees when viewed from the front (FIG. 2). Similarly, the spindles 60 that support the lower disks 48 rotate about an axis of rotation 63. The axis of rotation 63 is inclined toward the rearward end of the cutter rails 40 at an angle of about 0.7 degree when viewed from the side (FIG. 3) and is not inclined away from the center of the cutter rails 40 when viewed from the front (FIG. 2).

The upper and lower disks 46, 48 each have outer and inner surfaces 102, 104, a center section 106, and a sharpened edge 108. The outer surfaces 102 are flat in the region of the center section, tapering at an angle of five degrees toward the edge 108. The inner surface 104 tapers from the center section 106 to the edge 108 in steps, the last of which is at an angle of five degrees relative to the edge 108. The center section 106 is about 0.5 inch thick, and the edge 108 is approximately 1/64 inch thick. Both the upper and lower disks 46, 48 are made of steel. In the preferred embodiment, the disks 46, 48 are approximately 10 inches in diameter. During initial setup, adjacent disks 46, 48 are adjusted so that their edges 108 are in contact with each other. An exceedingly small overlap, approximately 1/64 inch or less, is permitted.

In operation, a pallet is positioned on the working surface 26 so that the stringer that is to be removed is pushed against the bar 33 (FIG. 1). With the selector switch set to "automatic," the operator depresses a foot switch to start the stringer removal cycle. When the cycle begins, air and hydraulic valves are actuated, causing the arms 28 to raise and support the pallet at a correct height for receiving the carrier assembly 16 (FIGS. 6 and 8). By raising the pallet, the pallet is vertically centered relative to the cutting disks 46, 48, thereby relieving bowing pressure on the lower deckboards.

Upon actuation of the hydraulic cylinder 100, the cutting assembly 44 is moved through the pallet (FIGS. 7 and 9). The upper disks 46 begin to shear any nails that hold the upper deckboards to the stringer. The bridge plate 50 makes nail-shearing easier because it causes the upper deckboards to be separated from the stringer.

Nail shearing is very effective for a variety of reasons. Because the disks have a large diameter and because they have an exceedingly small or no overlap at the edges 108, the nails are captured and sheared at a very favorable angle of attack. Because the spindles 60 are supported by upper and lower bearings 64, 66, flexure of the spindles 60 is prevented. Accordingly, unlike prior art devices, the edges 108 of the disks 46, 48 do not separate from each other, and nail shearing, rather than nail bending, occurs. The longitudinal offset of the upper disks 46 from the lower disks 48 not only permits easier cutting to occur with less resistance, but it permits the support structure for the spindle 60 (the mounting and support plates 62, 70 and the bearing carrier 68) to be adequately supported. Because nails are sheared at different longitudinal positions in the stringer, stresses on the stringer are reduced, leading to less stringer damage.

After the cutting assembly 44 has passed through the pallet, the carrier assembly 16 is retracted (FIG. 10) and the arms 28 are lowered. The removed stringer pushes the previously removed stringer onto the conveyor 76 for removal. If manual operation is desired, the only difference relative to the previously described automatic cycle is that retraction of the carrier assembly 16 is determined by the operator deactivating the foot switch.

As will be apparent from the foregoing description, stringer removal can be accomplished exceedingly efficiently, with minimal manual labor. The rollers 24 enable a pallet to be positioned easily on the working surface 26, and the movable arms 28 lift the pallet for proper insertion of the cutter and stabilizer rails 40, 56. The disks 46, 48 are non-powered and very reliable. The particular placement of the disks 46, 48 and their orientation results in effective nail-shearing action. After all of the nails that hold a given stringer in place have been sheared, the severed stringer is disposed of without any action being required of the machine operator. The old pallet can be moved from the table assembly 14 and a new pallet can be positioned in its place in a matter of seconds.

Although the invention has been described in its preferred form with a certain degree of particularity, it will be understood that the present disclosure of the preferred embodiment has been made only by way of example and that various changes may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. A machine for removing stringers from pallets, each pallet having spaced parallel stringers, upper and lower deckboards secured to the stringers on opposite sides thereof, the deckboards being disposed perpendicular to the stringers and defining open-ended spaces between the stringers, the machine comprising:

a table assembly that establishes a working surface upon which a pallet can be placed;

a carrier assembly spaced from the working surface, the carrier assembly including:

a pair of spaced, parallel, elongate cutter rails having upper and lower surfaces and first and second ends, the cutter rails being spaced a distance greater than the width of a stringer and adapted to receive a stringer therebetween, the first end of each cutter rail being tapered for insertion into a selected space between the stringers;

a cutting assembly connected to the cutter rails toward the first ends thereof, the cutting assembly including a rotatable upper disk and a rotatable lower disk connected to each cutter rail, the upper and lower disks each having a sharpened edge and outer and inner surfaces, the upper disks being spaced side-by-side such that the edges thereof are in contact with each other and the lower disks being spaced side-by-side such that the edges thereof are in contact with each other, the upper disks lying in a plane generally parallel with the upper surface of the cutter rails and the lower disks lying in a plane generally parallel with the lower surface of the cutter rails, the upper and lower disks being supported such that the distance therebetween does not change during a stringer removal operation; and means to separate the deckboards from the stringer as the upper and lower disks advance through the pallet; and means for moving the pallet and the carrier assembly toward and away from each other.

2. The machine of claim 1, further comprising means for lifting a pallet placed on the working surface a distance above the working surface adequate to center the stringers between the upper and lower disks.

3. The machine of claim 2, wherein the means for lifting includes:

a plurality of arms having first and second ends disposed beneath the working surface, the arms being pivotally mounted at the first end, the second end being free for movement between up and down positions, the up position being located above the working surface and the down position being located below the working surface; and an actuating mechanism for the arms, the actuating mechanism causing the arms to be pivoted so as to move the second end of the arms between the up position and the down position.

4. The machine of claim 3, wherein the actuating mechanism is a pneumatic cylinder connected to each arm.

5. The machine of claim 1, wherein the working surface is horizontal and the table assembly further includes a plurality of rollers that define the working surface, the rollers rotating about axes that are generally parallel with of the cutter rails.

6. The machine of claim 1, further comprising a pair of parallel, elongate stabilizer rails included as part of the carrier assembly, the stabilizer rails being disposed adjacent the cutter rails and parallel thereto, the stabilizer rails and the cutter rails being generally of the same size and shape, the stabilizer rails and the cutter rails being spaced a distance such that an adjacent cutter rail and stabilizer rail can fit within the space defined by two adjacent stringers.

7. The machine of claim 6, further comprising:

a plurality of generally vertically extending spindles, each disk being supported for rotation by a spindle; and a mounting plate for each of the spindles, the mounting plates extending between adjacent cutter rails and stabilizer rails, the mounting plates being adjustable relative to the cutter rails and the stabilizer rails in order to adjust the lateral and longitudinal position of the disks.

8. The machine of claim 7, wherein each of the mounting plates has a central opening therein, and further comprising:

a support plate that is rigidly connected to adjacent cutter rails and stabilizer rails, the support plate having a central opening generally aligned with the central opening in the mounting plate, the support plate having a plurality of parallel slots adjacent the central opening, the parallel slots being aligned with the longitudinal axes of the carrier rails and the stabilizer rails;

a bearing carrier that is disposed in the central opening in the mounting plate, the bearing carrier being rigidly secured to the mounting plate;

upper and lower bearings disposed in the bearing carrier, the upper and lower bearings supporting the spindle for rotation;

fasteners that extend through the slots in the support plate to connect the mounting plate to the support plate; and set screws that extend laterally through openings in the stabilizer rails, the set screws contacting the mounting plates.

9. The machine of claim 1, wherein the first ends of the cutter rails, when viewed from the side, are tapered from a larger dimension that defines the height of the rails to a smaller dimension at the ends of the rails; and wherein the tapered ends of the cutter rails, when viewed from above, are angled away from each other.

10. The machine of claim 1, wherein the means to separate the deckboards from the stringer is a bridge plate, the bridge plate being disposed atop and connected between the cutter rails, the bridge plate including legs lying atop each of the cutter rails, the legs having a beveled leading edge, and further including a notched portion between the legs.

11. The machine of claim 1, further comprising a plate disposed beneath the lower surfaces of the cutter rails and spanning the space therebetween, the plate and the cutter rails forming an open-ended trough into which removed stringers are inserted, the trough extending from a location near the first end of the cutter rails to a location toward the second end of the cutter rails.

12. The machine of claim 11, further comprising a conveyor positioned beneath the end of the trough remote from the first end of the cutter rails for receiving stringers displaced from the trough.

13. The machine of claim 1, wherein the carrier assembly is movable and the pallet is stationary during a stringer removal operation, the machine further comprising a frame to which the carrier assembly is mounted for back and forth movement, and wherein the means for moving the pallet and the carrier assembly toward and away from each other is a hydraulic cylinder connected between the frame and the carrier assembly, the hydraulic cylinder being disposed parallel to the path of travel of the carrier assembly.

14. The machine of claim 1, wherein the machine includes a frame to which the carrier assembly is mounted, the carrier assembly including a carriage having spaced side plates, an elongate rail secured to the frame; and supporting rollers included as part of the side plates, the supporting rollers being in contact with the elongate rail for movement therealong.

15. The machine of claim 14, further comprising means to position the cutter rails in different planes relative to the plane of the working surface, said means including:

a pair of uprights extending upwardly from the carriage, the cutter rails and the stabilizer rails being connected to the uprights by a pivotal connection at a location between the ends of the rails; and an adjustable support for the rear of the cutter rails, the adjustable support being in the form of threaded rods interconnecting the carriage and the cutter rails and the stabilizer rails at that end of the rails remote from the cutting assembly.

16. The machine of claim 1, wherein the spindles that support the upper disks rotate about an axis of rotation, the axis of rotation being inclined toward the fit end of the cutter rails at an angle of about 4.0 degrees when viewed from the side and being inclined away from the center of the cutter rails at an angle of about 2.5 degrees when viewed from the front.

17. The machine of claim 1, wherein the spindles that support the lower disks rotate about an axis of rotation, the axis of rotation being inclined toward the second end of the cutter rails at an angle of about 0.7 degree when viewed from the side and not being inclined away from the center of the cutter rails when viewed from the front.

18. The machine of claim 1, wherein the upper and lower disks each have a center section about 0.5 inch thick, and wherein the disks taper on the outer and inner surfaces from the center section to the sharpened edge, the sharpened edge having a thickness of about $1/64$ inch.

19. The machine of claim 1, wherein a selected pair of the upper disks or the lower disks are positioned closer to the ends of the cutter rails than the other pair.

20. The machine of claim 19, wherein the upper disks are positioned closer to the ends of the cutter rails than the lower disks, and the spindles for the upper and lower disks are spaced longitudinally of the cutter rails a distance of approximately the width of one deckboard.

* * * * *

UNITED STATES PATENT AND TRADEMARK OFFICE
CERTIFICATE OF CORRECTION

PATENT NO : 6,032,351
DATED : March 7, 2000
INVENTOR(S) : Timothy R. Beane

It is certified that error appears in the above-identified patent and that said Letters Patent is hereby corrected as shown below:

Column 10, line 8, "fit" should be —first—.

Signed and Sealed this

Twenty-third Day of January, 2001

Attest:

Q. TODD DICKINSON

*Attesting Officer*   *Commissioner of Patents and Trademarks*